Patented Aug. 4, 1925.

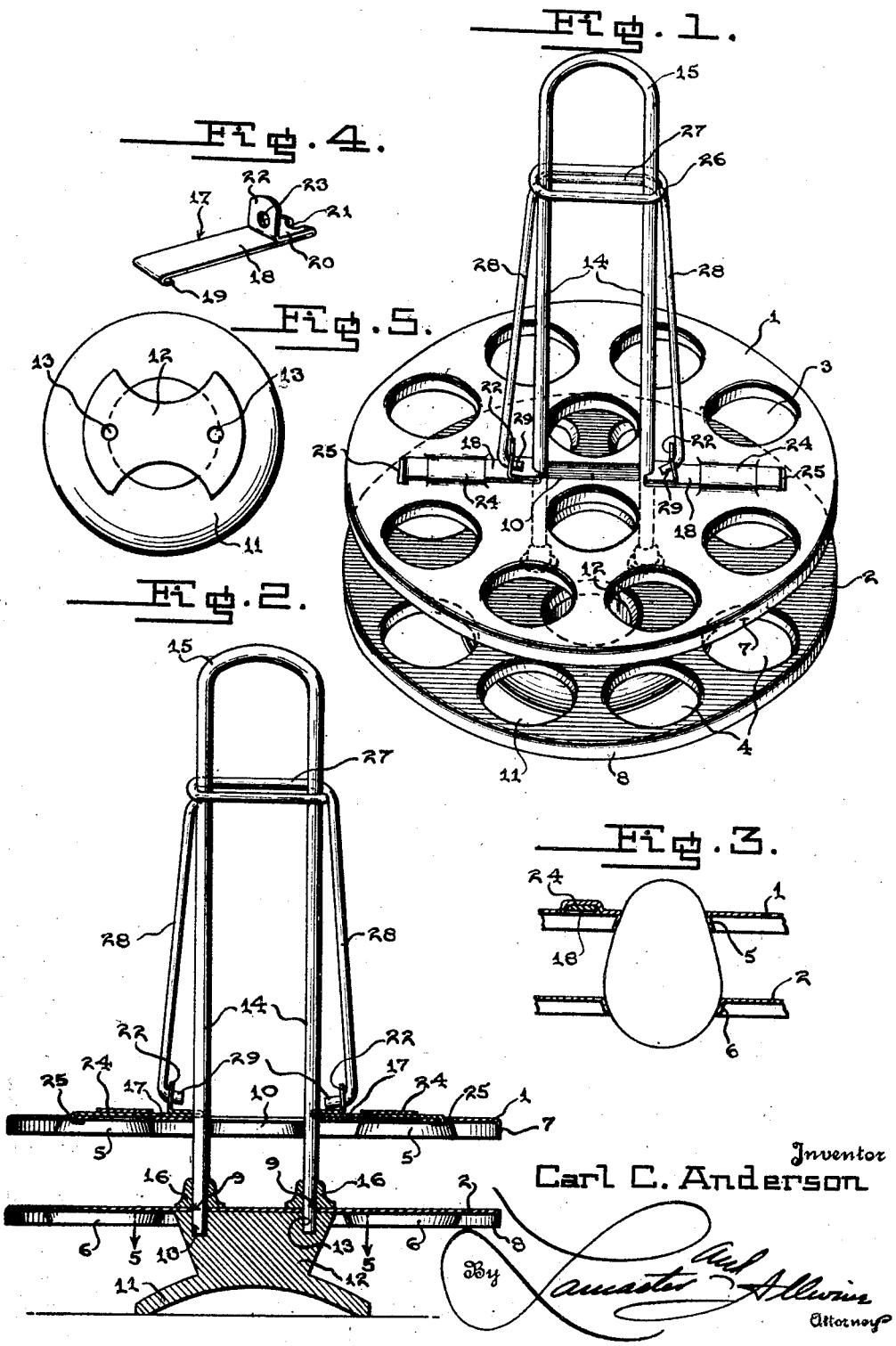

1,548,242

UNITED STATES PATENT OFFICE.

CARL CONRAD ANDERSON, OF ISLAND PARK, IDAHO.

EGG BOILER.

Application filed September 29, 1924. Serial No. 740,668.

*To all whom it may concern:*

Be it known that CARL C. ANDERSON, a subject of the King of Sweden, residing at Island Park, in the county of Fremont, State of Idaho, have invented certain new and useful Improvements in an Egg Boiler, of which the following is a specification.

This invention relates to an improved egg boiler and one object of the invention is to provide an egg boiler having improved egg holding plates mounted in a special manner and having one mounted for movement toward and away from the other and having special means for imparting movement to it and holding it in a set position.

Another object of the invention is to provide an egg boiler having one of the egg holding plates secured to a base by a handle member which may serve as means for slidably mounting the movable egg engaging plate and operating means for the second egg engaging plate.

Another object of the invention is to so construct this egg boiler that the operating means for the movable egg engaging plate that it may serve as means for retaining latch members in frictional engagement with the handle member of the base and stationary egg engaging plate.

Another object of this invention is to provide an egg boiler which will be of a simple construction and strong and durable and so constructed that the eggs can be easily put in place or removed and the device permitted to be freely handled without danger of the eggs slipping from between the holding plates.

Other objects and advantages will be brought out in the course of the following description.

This invention is illustrated in the accompanying drawing wherein a preferred embodiment of the invention is disclosed and wherein:—

Figure 1 is a perspective view of the improved egg boiler.

Figure 2 is a vertical sectional view through the egg boiler,

Figure 3 is a fragmentary sectional view showing the manner in which an egg is held in place, Figure 4 is a perspective view of one of the latch members for holding the movable disk or plate in a set position, Figure 5 is a sectional view taken along the line 5—5 of Figure 2 and showing the base member in top plan.

This improved egg boiler is provided with upper and lower egg holding plates or disks 1 and 2, the disk 1 constituting movable egg holding means and the disk 2 stationary egg holding means. Each of these disks is formed from sheet metal and is stamped to provide openings 3 and 4 about which are provided depending flanges 5 and 6 so shaped that when eggs are placed between the plates they will extend into the openings 3 and 4 and be engaged with the flanges as shown in figure 3. Depending flanges 7 and 8 are provided about the peripheries of the plates so that the person using the egg boiler will not be liable to be cut by the edges of the plates. Openings 9 are provided in the lower plate 2 upon opposite sides of its center and the upper plate 1 is provided with a slot 10 which will be disposed above the openings 9 when the egg boiler is assembled. While it has been stated that the disks 1 and 2 are formed of stamped sheet metal it will be obvious that they could be formed of other materials and either provided with the flanges 5, 6 and 7 or formed as thick disks having openings 3 and 4 conforming to the shape of the flanges 5 and 6.

In order to support the disk 2 there has been provided a base 11 having a thickened upstanding central portion forming a block 12 upon which the disk 2 rests. This block 12 is provided with sockets 13 with which the openings 9 of the disk 2 will register so that the arms 14 of a U-shaped handle 15 can pass through the openings 9 and into the sockets 13 where they will be firmly held in place. Collars 16 are carried by these arms 14 and engage the disk 2 so that when the handle is in place the disk 2 will be prevented from having any movement relative to the base.

The disk 1 is slidably mounted by having the handle extending through the slot 10 and in order to retain this disk 1 in a set position relative to the disk 2, there have been provided latches which are slidably carried by the disk 1 for movement longitudinally of the slot 10. Each of these latches 17 is formed as shown in Figure 4 and by referring to this figure it will be seen that each of these latches is formed from a strip of metal bent adjacent one end to provide a shank 18 and downturned hook 19. An opening is formed in this strip and the strip is bent back upon itself diametrically of this opening to provide an upper leaf 20 and recess 21. The end of the upper leaf 20 is turned upwardly to provide a tongue 22 and this tongue has an opening 23. These latches 17 slidably fit beneath the tongues 24 formed by providing slits in the upper disk and the hooks 19 engage in the slots 25 so that the latches can be limited in their sliding movement. These latches are to be drawn towards each other so that the arms 14 of the handle will be received in the recesses 21 and the latches frictionally grip the arms 14 to retain the disk 1 in a set position. There has therefore been provided a spring forming member 26 formed from a strand of resilient metal, this strand being bent to provide an eye 27 coiled about the handle 15 and having depending arms 28 extending therefrom and having their free ends bent to provide fingers 29 passed through the openings in the tongues 22. These arms 28 are spread apart in order to pass the fingers 29 through the openings 23 and when released will move towards each other so that the latches are drawn into finding engagement with the arms 14 of the handle member 15.

When this device is to be used the upper disk is slipped upon the handle 15 and the spring member 26 is then put in place with the eye 27 disposed about the handle 15 and the arms 28 engaged with the tongues of the latches. If desired this spring member can be engaged with the latches before the upper disk is put in place. After the disk 1 is in place upon the handle it will be disposed above the lower disk a sufficient distance to permit the eggs to be placed in the openings 4 and the upper disk can then be moved downwardly until the upper ends of the eggs pass through the openings 3. The eggs will therefore be engaged by the flanges 5 and 6 and the disks will firmly hold the eggs in place as shown in Figure 3. The egg carrier can then be lifted by the handle 15 and placed in a receptacle holding boiling water and left in the receptacle until the eggs are cooked the desired amount. It will then be lifted from the receptacle and the upper disk slid upwardly and the eggs removed. The eggs can therefore be easily placed in the hot water and removed without the eggs striking against each other or against the vessel containing the water and becoming broken. It also makes it unnecessary to remove the eggs from the water with a spoon and then from the spoon with the fingers and therefore the fingers will not be burned by handling the hot eggs. This device will also permit a number of eggs to be cooked and all of them removed at the same time so that they will all be cooked the same amount. When the eggs are to be removed from the egg carrier, the spring member 26 which forms a handle for the disk 1 will be grasped and the disk drawn upwardly a sufficient distance to permit removal of the eggs or if desired entirely removed from the handle 15.

While the form illustrated and specifically described is the preferred form it will be understood that changes of construction may be found desirable and therefore the right is reserved to make changes such as come within the scope of the appended claims.

I claim:

1. A culinary implement comprising a base, a lower disk resting upon said base, a handle having arms extending through said disk and connected with the base to hold the lower disk in place upon the base, an upper disk slidable upon the handle towards and away form the lower disk, said disks having sockets for receiving articles placed between the disks, latches carried by the upper disk for engagement with the arms of said handle, and resilient handle means for said upper disk connected with said latches and serving to hold the latches in binding engagement with the handle of the lower disk whereby the upper disk may be retained in a set position.

2. A culinary implement comprising upper and lower article engaging members, a handle extending upwardly from the lower article engaging member through the upper article engaging member and slidably mounting the upper article engaging member, latches carried by the upper article engaging member, and resilient means connected with said latches to hold the latches in frictional binding engagement with said handle and retain the upper article engaging member in a set position, said resilient means serving as means for adjusting the position of the upper article engaging member.

3. A culinary implement comprising upper and lower article engaging members, a handle for the lower article engaging member serving as means for slidably mounting the upper article engaging member, latches slidably carried by the upper article engaging member, and means for imparting movement to the upper article engaging member slidably engaged with said handle and having resilient members engaging said latches to hold the latches in binding engagement with said handle.

4. A culinary implement comprising a base, a lower disk resting upon said base, a handle having depending arms passing through said disk and secured to said base and having collars engaging the upper face of the disk to hold the disk upon the base, an upper disk having a slot receiving said handle to slidably mount the upper disk, said disks having openings and flanges about the openings for engaging portions of articles placed between the disks and extending into the openings, latches carried by the upper disk, and an actuating member for the upper disk slidable upon the handle and having resilient arms engaging said latches to hold the latches in binding engagement with said handle.

5. A culinary implement comprising a base, a lower disk resting upon said base, a handle having depending arms passing through said disk and secured to said base and having collars engaging the upper face of the disk to hold the disk upon the base, an upper disk having a slot receiving said handle to slidably mount the upper disk, said disks having openings and flanges about the openings for engaging portions of articles placed between the disks and extending into the openings, the upper disk being provided with guides in spaced relation to the ends of the handle receiving slot and openings between the guides and periphery of the disk, latches formed of strips slidably held by said guides and having their outer ends bent to form hooks extending through the openings of the upper disk and their inner end portions bent back upon themselves and then upwardly to provide tongues, said tongues having openings provided therein, and an actuating member formed of a strand of resilient material bent to provide a coil slidably fitting upon the handle and arms extending downwardly from the coil and having their free ends bent to provide inturned fingers engaged in the openings of said tongues to draw the latches into binding engagement with said handle.

CARL CONRAD ANDERSON.